Jan. 12, 1960  M. M. AYDELOTT  2,920,383
PIPE PULLER
Filed Sept. 10, 1956  2 Sheets-Sheet 1
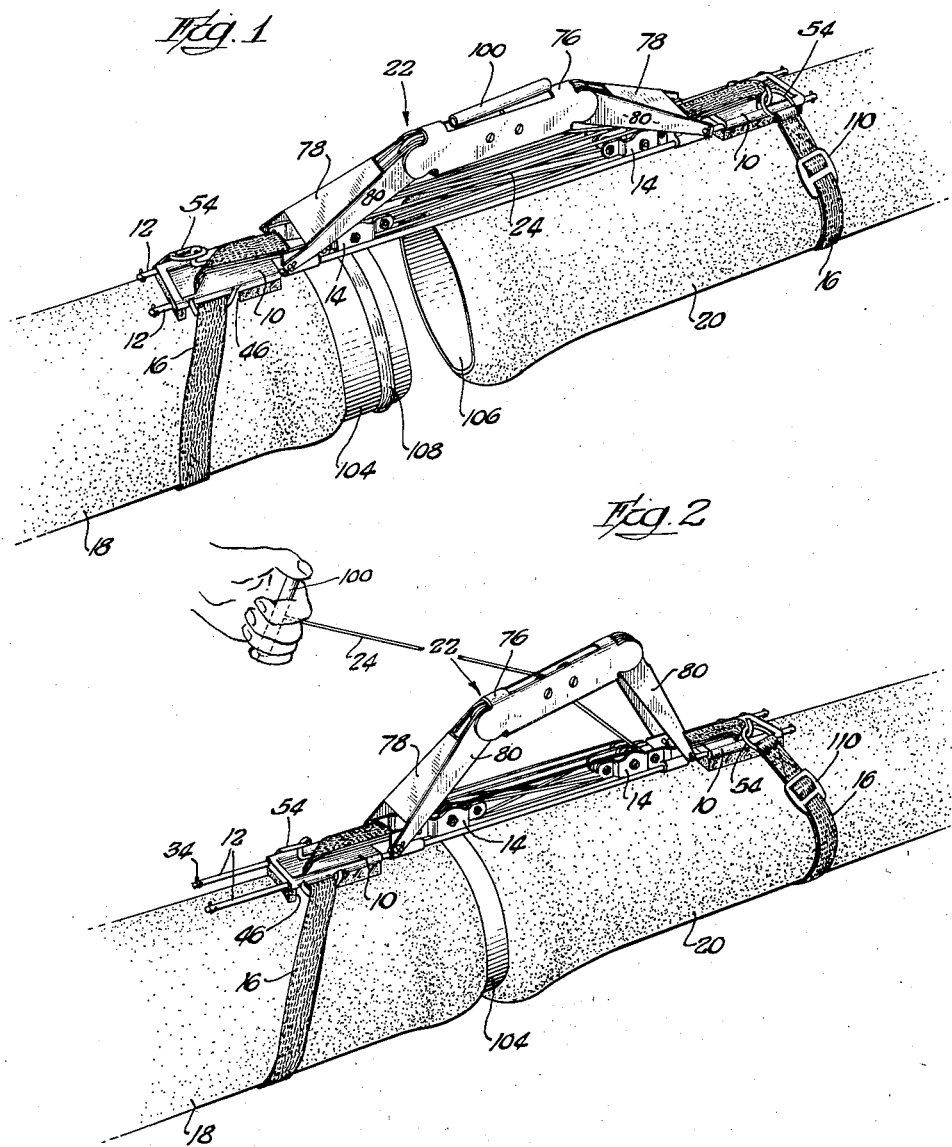
INVENTOR.
MAX M. AYDELOTT
BY
Fulwider, Mattingly + Huntley
ATTORNEYS.

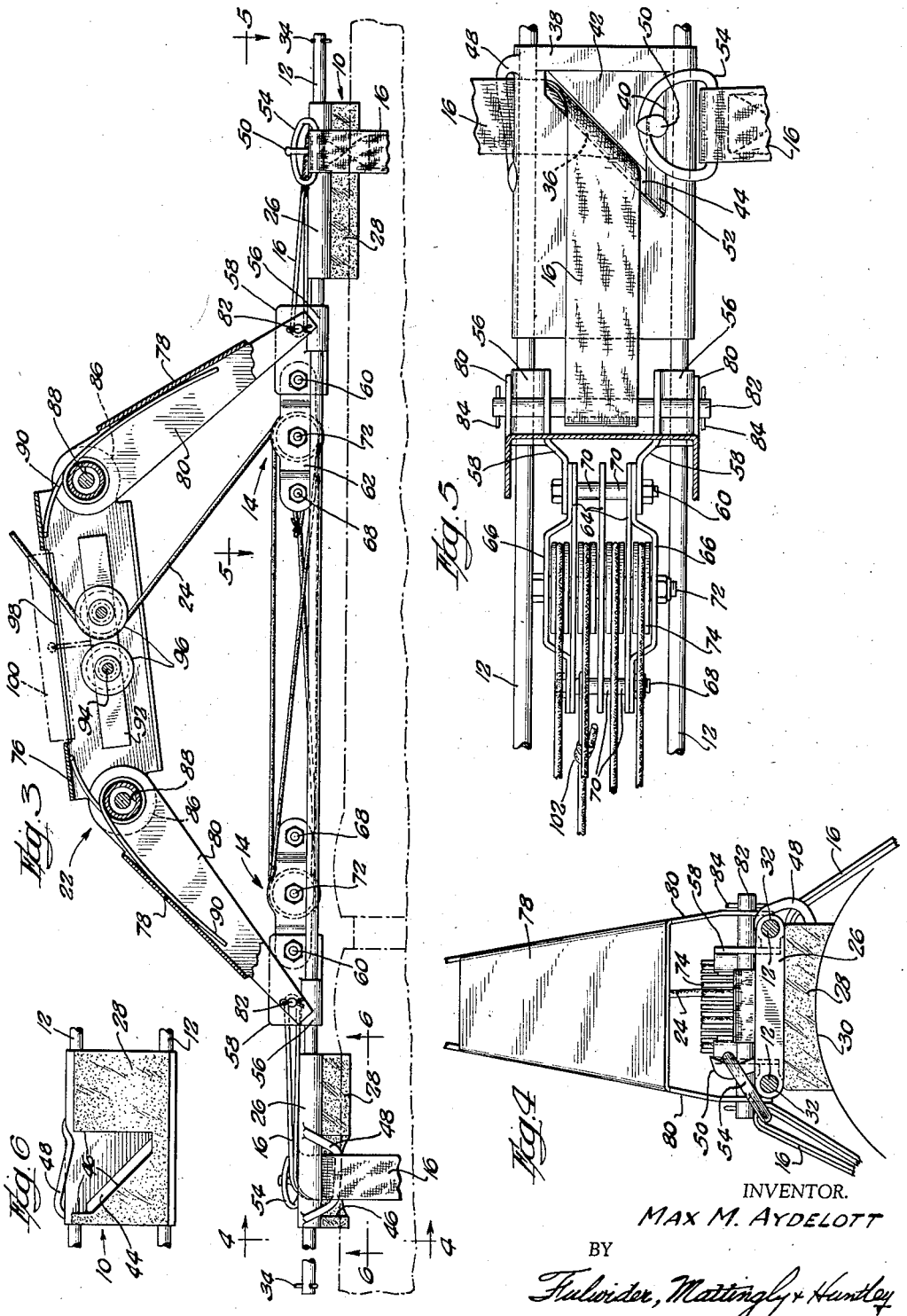
INVENTOR.
MAX M. AYDELOTT

United States Patent Office 2,920,383
Patented Jan. 12, 1960

2,920,383

PIPE PULLER

Max Merton Aydelott, South Pasadena, Calif., assignor to U.S. Industries, Inc., New York, N.Y., a corporation of Delaware Application September 10, 1956, Serial No. 608,966

4 Claims. (Cl. 29—237)

The present invention relates generally to the field of pulling apparatus and particularly to such apparatus for pulling two tubular members together for making a telescoped or similar joint.

The making up of telescoped joints of heavy pipe in the field is a difficult manual operation. The difficulty of maneuvering heavy sections of pipe is obvious and it will also be appreciated that considerable force is required to slide the end of one pipe into the end of a mating pipe section. If the joint is to be made fluid tight, as by the use of a compressible O-ring seal, the frictional resistance to be overcome is greatly increased.

Due to the cylindrical configuration of the pipe, it is difficult to secure an effective purchase thereon that will not slip. For the same reason sufficient leverage to overcome the resistance to telescoping of the piping cannot be easily applied. Many devices have heretofore been devised and marketed as pipe pullers but they generally employ cumbersome, time consuming means for gripping the pipes and moving sections thereof into telescoped relation.

An object of my invention is to provide a pipe pulling device with efficient lever means that permit the end of one section of pipe to be pulled into another pipe by a single continuous movement.

Another object of the invention is to provide a pipe puller having pipe gripping means that will not slip and which is of such efficiency that by the use thereof a single person can quickly and easily make up telescoped joints of heavy pipe sections.

It is also an object of my invention to provide a device of this character in which the lever means act directly on the gripping means whereby initial application of leverage serves to first tighten the gripping means prior to pulling the pipes together.

Another object of the invention is to provide a pipe puller that is at all times in readiness for immediate use. The pipe puller has a pair of pipe gripping devices that are normally held spaced apart so that they can be attached to the pipes to be joined without any preliminary adjustment.

It is also an object of the invention to provide a pipe puller that can be operated from either end and which is of simple, durable design that will withstand very heavy use and can be marketed at moderate cost.

These and other objects and advantages of my invention will be apparent from the following description of a presently preferred form thereof and from the drawings illustrating that form in which:

Figure 1 is a perspective view showing the invention attached to a pair of coaxially aligned pipes preparatory to telescoping them;

Figure 2 is a perspective view similar to Figure 1 showing the invention in use in telescoping the pipes;

Figure 3 is a side elevation, partly in longitudinal section, of the device as it appears when in use as in Figure 2;

Figure 4 is an end view, on enlarged scale, taken in the direction 4—4 of Figure 3;

Figure 5 is a partial top view, on enlarged scale, taken in the direction 5—5 of Figure 3; and Figure 6 is a partial bottom view of a portion of the gripping means of the invention.

Referring now to the drawings for the general arrangement of the invention and in particular to Figures 1 and 2, it will be seen that the invention includes a pair of bases, indicated generally by the numerals 10, slidably carried at opposite ends of two guide rods 12. The guide rods 12 also slidably mount two pulley blocks 14 each of which serves to anchor one end of a strap 16. Each of the straps 16 is held in the form of a loop around one of the pipes 18, 20 by means of one of the bases 10. The pulley blocks 14 are interconnected by link means, generally identified at 22. A line 24 is connected at one end to one of pulley blocks 14 and wound between the sheaves carried by the pair of blocks with its free end accessibly carried by the link means 22. A continuous pulling force applied to the free end of line 24 will initially tighten the loops of straps 16 around the pipes 18 and 20 and then move the blocks 14 towards one another to cause telescoping of the pipes.

The bases 10 are identical and can best be seen in Figures 3–6. As is shown in Figure 3 each base 10 includes a substantially rectangular metal plate 26 that has a pad 28 fastened to its underside by adhesive means or the like. The pad 28 is preferably made of hard rubber and as Figure 4 shows, it is formed with a transversely concave lower side 30 that is substantially complementary to the surface of the pipe on which it is to be placed.

Each plate 26 along both of its longitudinal edge portions has a bore 32 formed therethrough which is adapted to slidably receive one of guide rods 12. The bases are thus slidably carried by the two parallel rods 12 for longitudinal movement towards and away from one another and cotter pins 34 at opposite ends of rods 12 serve to prevent displacement of the bases 10 from the rods. As will be apparent, the rods 12 provide the advantage of keeping the device assembled in the desired longitudinal alignment.

It will be observed that the straps 16 define loops to embrace the pipes and then turn in a direction axially of the pipes. In order to insure uniform transverse distribution of the pulling force exerted on straps 16 it is important that this turning be accomplished without any distortion of the straps such as would interfere with the purchase of the looped portions on the pipes. The bases 10 accomplish this turning in a manner to preserve a uniformly transversely distributed tension on the straps, i.e. the edges of the straps are under the same tension as the longitudinal center lines thereof. This uniformly distributed tension in the looped portions of the broad straps 16 thus utilizes their area to provide a substantial area of frictional engagement with the pipes.

To this end, each base 10 is adapted to receive one of the straps 16 in the manner shown in Figures 4 and 5. As Figure 5 shows, each base 10 has a diagonal slot 44 defined by a diagonal shoulder 36 formed in the plate 26 and the diagonal edge of a triangular sheet 42. The sheet 42 is fitted into a substantially triangular opening defined in plate 26 by the shoulder 36, a cross member 38 and a side wall 40. The sheet 42 is disposed substantially flush with the lower surface of plate 26 and is affixed thereto along cross member 38 and side wall 40 by welding.

Referring to Figure 6, it will be seen that the pad 28 is formed with a passage 46 that communicates with the slot 44 in plate 26 and extends transversely therefrom to a side of base 10. Fastened to the side of plate 26 across the opening of the passage 46 through pad 28 is a substantially U-shaped strap guide 48 such as is shown in Figure 3 at the left. On the opposite side of plate 26 directly across from guide 48 is a hook 50. Referring to Figures 4 and 5, it will be seen that hook 50 is substantially L-shaped and its stem portion 52 is recessed in the triangular depression at the end of plate 26 and welded along the side wall 40.

As appears in Figures 1 and 2, the structure just described permits straps 16 to be tightly wrapped around the pipes 18 and 20 in such a way as to prevent any binding or twisting thereof such as would interfere with the purchase of the straps. Each of the straps, as it extends longitudinaly away from a pulley block 14 is rolled over diagonal shoulder 36 (which is preferably rounded) and passes through the slot 44 of base 10. The strap then extends transversely through the passage 46 and guide 48 before coming into encircling contact with the pipe, as is shown in Figure 4. A ring 54 connected to the free end of strap 16 removably engages the hook 50.

As can be seen in Figure 3, the two pulley blocks 14 are also slidably carried by the rods 12 and are disposed between the bases 10. Blocks 14 are identical to one another and therefore but one of them need be described.

Referring to Figure 5, pulley block 14 is seen to include a pair of sleeves 56 each of which slidably receives one of rods 12. Each sleeve 56 rigidly mounts a vertically disposed member 58 that extends longitudinally inwardly beyond the sleeve where the two laterally spaced members 58 are interconnected by nut and bolt means 60. The means 60 also serve to support one end of a gang sheave bracket 62. The bracket 62 is comprised of three laterally spaced straight pieces 64 embraced by stepped out side pieces 66. At their longitudinally inner ends the pieces 64 and 66 are maintained in assembled relationship by nut and bolt means 68. It will be noted that both of bolt means 60 and 68 mount a pair of spacers 70 that serve to hold the straight pieces 64 in laterally spaced apart position. A transversely disposed shaft 72 is mounted at the center of bracket 62 to support four independently rotatable sheaves 74 each of which is separately housed between a pair of pieces 62, 64.

To prevent entanglement of the line 24 when mounted on the pulley blocks 14 it is desirable to provide some means biasing them apart thus keeping the line 24 taut. The spring loaded link means 22 serve this purpose and additionally support the free end of the line in such a way that it can be pulled towards either end of the pipe puller but preferably in the direction shown in Figure 2.

Link means 22 is shown in longitudinal section in Figure 3. The link means includes an elongate center member 76 between the two link arms 78. Each link arm 78 is substantially U-shaped in transverse cross-section, having opposite side members 80 that are longer than the web of the arm. As can be seen in Figures 1, 2 and 4, the side members 80 of the link arms incline towards one another being more widely spaced apart at their bottom ends than at their upper or outward ends. Each arm 78 is pivotally connected to one of blocks 14 by means of a transverse shaft 82 that is supported in bores formed in members 58 of each block. Cotters 84 at the opposite ends of shaft 82 prevent its displacement. It will be noted that a bight in strap 16 embraces the shaft 82 whereby the strap connects the block 14 and base 10.

The opposite side members 80 at the upper ends of link arms 78 are pivotally connected to an overlapping pair of laterally spaced apart circular projections 86 that are continuations of the opposite side walls of center member 76. The projections 86 are partially shown in dotted lines in Figure 3. A hollow tubular piece 88 bridges the projections 86 to provide a pivotal seat for aligned bores in the upper ends of side members 80 to effect the pivotal connection. A wire spring 90 is coiled around tubular piece 88 with one of its free ends bearing against center member 76 and its other end against the web of link arm 78. The center member 76 and the two link arms 78 are thus urged into alignment and yieldably resist the movement of the pulley blocks towards one another.

On the interior of each sidewall of center member 76 is rigidly affixed a longitudinally extending filler plate 92. The two plates 92 serve to support a pair of transversely disposed pins 94 between them to rotatably support two guide pulleys 96. As Figures 1, 2 and 3 show, the upper face of center member 76 has an elongate rectangular cutout 98 formed therein which is adapted to seat a tubular handle 100. The outer free end of flexible member 24 is fastened to the center of handle 100 to pass inwardly between the guide pulleys 96 and then wound around the sheaves 74 of the two oppositely disposed pulley blocks 14. Referring to Figure 5, it can be seen that the inner end of line 24 is tied to one of the spacers 70 of one of blocks 14, as at 102.

The manner of use of the invention is very simple. The first steps are shown in Figure 1 wherein the two pipes 18 and 20 are shown lying on a ground surface in alignment preparatory to telescoping them. The two pipes in this instance are lined with cement except for an end portion of the inner liner 104 of pipe 18. The liner 104 is adapted to be slidably received in the liner 106 of pipe 20 and is circumferentially grooved to hold an elastic O-ring seal 108 in order to make up a fluid tight joint.

The pipe puller is placed on top of the pipes with one base 10 on pipe 18 and the other base 10 on pipe 20. The two straps 16 are then wrapped around the pipes and adjusted by means of buckles 110, if necessary, with rings 54 engaging hooks 50. Handle 100 is then grasped and preferably pulled in the direction shown in Figure 2. It will be noted that because of the mounting of the free end of the line 24 between the guide pulleys 96 that the line can be pulled from either end of the pipe puller. Initial pulling of line 24 will immediately cause movement of blocks 14 towards one another but the bases 10 will remain stationary until all the slack has been taken up in the straps 16. Continued pulling will then force the pipes to be drawn together into telescoping relationship. When liner 104 contacts liner 106 it may be necessary to pause momentarily to check the alignment of the pipes.

After the pipes have been joined in this manner, the straps 16 are unhooked and the device lifted from the pipes. Under the urging of springs 90, link means 22 will expand causing parting of the blocks 14 whereby the line 24 will be retracted. The spring means will keep the line tautly extended between blocks 14 in condition for immediate re-use of the pipe puller.

While there has been shown herein what is considered to be the preferred embodiment of the present invention, it will be apparent that various modifications and changes may be made with respect to the foregoing description without departing from the spirit of the invention or the scope of the following claims.

I claim:

1. A device for telescoping two coaxially aligned pipes, comprising: a pair of parallel guide rods; a pair of bases each of which is slidably mounted on both of said rods and is formed with a slot therethrough; a pipe engaging pad affixed to each of said bases, each of said pads being formed with a passage that extends from said slot to a side of said base; a pair of sheave supporting pulley blocks slidably mounted on said rods between said bases; a pair of straps each of which is fastened at one end thereof to one of said blocks to pass through said slot of one of said bases and the passage of said pad for encircling one of said pipes, with the other ends of said straps being adapted for connection to cooperating portions of said bases; a pair of link arms each of which is pivotally connected at the lower end thereof to one of said blocks; a center member pivotally interconnected to the upper ends of said link arms; means mounted in said center member and adapted to guide a line therethrough to support said line for pulling thereof through said guide means from either end of said device; and a line mounted on the sheaves carried by said blocks and anchored to one of said blocks whose free end extends outwardly from said center member between said guide means so that when said free end is pulled, said pulley blocks draw said straps into tightly encircling engagement with said pipes for a secure purchase thereon whereby further pulling moves said pipes into telescopic engagement.

2. A device for telescoping a pair of coaxially aligned pipes comprising: a pair of bases, one for each of said pipes, adapted to be seated in longitudinal alignment along one side of said pipes; elongate rigid means slidably engaged with both of said bases to maintain said longitudinal alignment thereof; a flexible strap on each of said bases adapted to be connected at one end to a cooperating portion of said base to encircle one of said pipes and having its other end extending through an opening formed in said base; block and tackle means between said bases and connected at opposite ends thereof to said other ends of said straps to pull said straps into tightly encircling engagement with said pipes for a secure purchase thereon whereby said pipes can be pulled into telescoping engagement by said block and tackle means; a means for each end of said block and tackle means to connect opposite ends of said block and tackle means to said alignment means for slidable movement independently of said bases whereby upon initial actuation of said block and tackle means, said opposite ends move towards one another to take up slack in said straps, said connecting means also serving to restrain the pulling force of said block and tackle means between said bases in longitudinal alignment with said pipes; and spring-loaded link means connected to said opposite ends of said block and tackle means to yieldably bias said block and tackle means to a fully extended position whereby release of an actuating force permits the return of said block and tackle means to a condition of readiness for immediate re-use of said device.

3. A device for telescoping a pair of coaxially aligned pipes comprising: a pair of bases, one for each of said pipes, adapted to be seated on adjacent end portions of said pipes substantially in longitudinal alignment with and along the same side of said pipes; a strap on each of said bases that is adapted to be connected at one end thereof to said base and adapted for encircling engagement with the pipe on which said base is mounted with the other end of said strap extending through an opening formed in the base associated therewith; block and tackle means comprising a pair of sheave-supporting blocks, each of which is connected to said other end of one of said straps with said sheaves of both said blocks drivingly engaged by a flexible line that can be pulled to actuate said block and tackle means whereby said straps are concurrently drawn into tightly encircling engagement with said pipes for a secure purchase thereon and said pipes are telescopically moved together; a plurality of link members pivotally interconnected between said pair of blocks and having guide means through which a portion of said line passes to be supported for pulling from either end of said device; spring means on said link members for yieldably urging said blocks apart whereby said line is tautly suspended between the sheaves of said blocks to prevent fouling of said line in the absence of an actuating force and said block and tackle means is normally maintained expanded in condition for use; elongated rigid means slideably engaged with said blocks and said bases to maintain said bases and block and tackle means assembled in longitudinal alignment; and stop means to limit spreading apart of said blocks in response to the force of said spring means.

4. A device for telescoping a pair of coaxially aligned pipes comprising: a pair of bases, one for each of said pipes, adapted to be seated on adjacent end portions of said pipes substantially in longitudinal alignment with and along the same side of said pipes; a strap on each of said bases that is adapted at one end thereof for releasable connection to said base and adapted for encircling engagement with the pipe on which said base is mounted with the other end of said strap extending through an opening formed in the base associated therewith; block and tackle means comprising a pair of sheave-supporting blocks, each of which is connected to said other end of one of said straps with said sheaves of both said blocks drivingly engaged by a flexible line that can be pulled to actuate said block and tackle means whereby said straps are concurrently drawn into tightly encircling engagement with said pipes for a secure purchase thereon and said pipes are telescopically moved together; a plurality of link members pivotally interconnected between said pair of blocks to maintain said block and tackle means in assembled relationship and having guide means through which a free end portion of said line passes to be supported for pulling on said line from either end of said device; spring means on said link members for yieldably urging said pair of blocks apart whereby said line is tautly suspended between the sheaves of said blocks to prevent fouling of said line in the absence of an actuating force and said block and tackle means is normally maintained in expanded condition for use; and stop means on said line adapted for engagement with said link members to limit spreading apart of said blocks in response to the force of said spring means.

References Cited in the file of this patent

UNITED STATES PATENTS

| | | |
|---|---|---|
| 307,308 | Jones | Oct. 28, 1884 |
| 870,931 | Claiborne | Nov. 12, 1907 |
| 921,973 | Gillett et al. | May 18, 1909 |
| 1,407,707 | Snuffer et al. | Feb. 28, 1922 |
| 1,894,835 | Smith et al. | Jan. 17, 1933 |
| 1,977,509 | Ferguson | Oct. 16, 1934 |
| 2,505,883 | Chevalier | May 2, 1950 |
| 2,634,093 | Hays | Apr. 7, 1953 |